Figure 1:
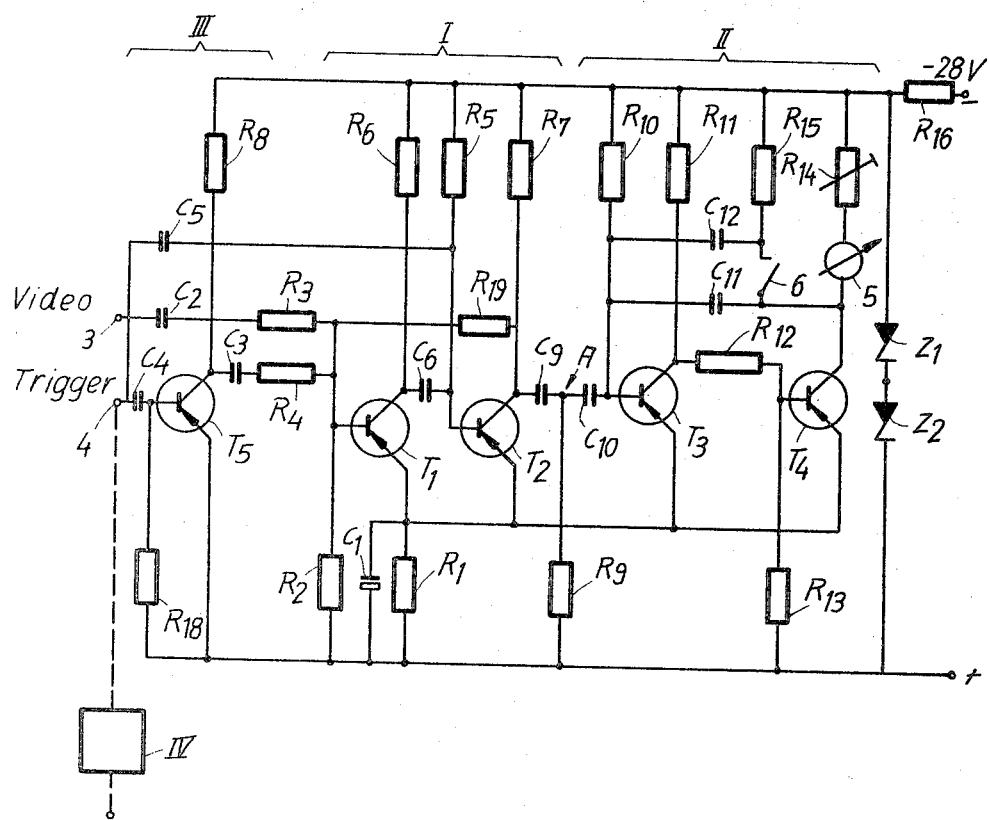

May 2, 1967  H. SCHÖNEBORN  3,317,908
RADAR ALTIMETER

Filed Oct. 6, 1964  3 Sheets-Sheet 1

Inventor
Hellmuth Schöneborn
By Muslow and Toren
Attorneys

United States Patent Office 3,317,908
Patented May 2, 1967

3,317,908
RADAR ALTIMETER
Hellmuth Schöneborn, Sauerlach, Munich, Germany, assignor to Bölkow Gesellschaft mit beschrankter Haftung
Filed Oct. 6, 1964, Ser. No. 401,828
Claims priority, application Germany, Oct. 9, 1963, B 73,799
11 Claims. (Cl. 343—13)

This invention relates to altitude indications for aircraft and, more particularly, to a novel method of and apparatus for continuously indicating the true altitude, above ground, of an aircraft and utilizing existing radar equipment on the aircraft.

The most common way of determining the altitude of an aircraft is to use a barometric altimeter. However, aside from the fact that the zero reference points of barometric altimeters must be re-set at intervals in dependence upon the region over which the aircraft is flying, such barometric altimeters provide false altitude indications due to changes in atmospheric pressure, and also when the aircraft passes through the sonic barrier. These false indications can lead to ground crashes of the aircraft relying upon barometric altimeters, and to the resultant loss of the aircraft.

Accordingly, in so far as available space in an aircraft permits, radio altimeters are preferably used for indicating the true altitude of the aircraft above ground. In radio altimeters, a carrier wave, which is frequency-modulated in a preselected manner, is radiated both to the ground and to a receiver on the plane and is used for measuring the true altitude. In the receiver, the direct wave and the wave reflected from the ground are superposed. The resulting differential frequency, as indicated by a frequency meter, is a measure of the true altitude of the aircraft above ground.

In high performance aircraft, such as fighter planes, installation of altimeters is generally not possible due to the lack of space, since the available space in such planes is occupied by voluminous electronic equipment for other purposes. Nevertheless, such high performance aircraft always are equipped with a fire control radar, which not only permits attacks against ground targets but which also provides radar mapping of the ground. However, in a so-called "ground mission" the true altitude of ground can be determined approximately by measuring the so-called "altitude circle" on the indicating screen of the cathode ray tube of the radar. For this purpose, such screen is provided with a scale which, however, permits only an incomplete estimate of the altitude whose value is low compared to the measuring range, for example 80 or 40 N.M. (nautical miles).

Additionally, such measurement using the altitude circle on the screen of the cathode ray tube requires manual setting of the radar receiver by the pilot. This, and the fact that a visual estimate of the altitude is required, imposes severe additional stresses on the pilot and such stresses are intolerable during an attack. Experience has shown, therefore, that the pilot relies on the additionally installed and direct indicating barometric altimeter despite all its short comings.

An object of the present invention is to provide a method for continuously indicating the true altitude, above ground, of an aircraft already equipped with radar.

Another object of the invention is to provide apparatus for continuously indicating the true altitude, above ground, of an aircraft equipped with radar, and utilizing such radar.

A further object of the invention is to provide continuously a true indication of the altitude, above ground, of radar equipped aircraft and utilizing, as a measure of the altitude, the time interval between the instant of transmission of a transmitting pulse of the radar device and the instant of arrival of the first ground echo pulse thereafter.

Yet another object of the invention is to provide apparatus for continuously indicating the true altitude, above ground, of a radar equipped aircraft and involving suppressing the direct pulses to the radar receiver, checking of the presence of ground echo pulses, and initating, in the presence of ground echo pulses, a measuring means which is effective during the time interval between the transmitting pulse and the arrival of the first ground echo pulse thereafter.

Yet a further object of the invention is to provide a method of and apparatus of the foregoing type including current measuring means in the output circuit of the apparatus providing a measure of the time interval between a transmitting pulse and the first ground echo pulse thereafter, the current measuring means thus providing a measure of the true altitude of the aircraft above ground, and which measurement may be used either to indicate such true altitude or may be used for control purposes such as for guiding the aircraft or for fire directing.

The present invention is based on the fact that, with a radar operating on a "ground mission," information with respect to the true altitude above ground is contained in the time interval between the transmitting pulse of the radar device and the arrival of the first ground echo pulse thereafter. Thus, the actual problem is to effect, with simple means, an accurate measurement of this time interval and to indicate the result continuously in an indicating altimeter.

For this purpose, the invention includes a switching arrangement suppressing the direct pulses of the radar receiver, a switching arrangement checking the presence of ground echo pulses, and a switching arrangement, released by the just-mentioned switching arrangement in the presence of ground echo pulses, and effective only for the time interval between a transmitting pulse and the arrival of the first ground echo pulse. This last switching arrangement has an output circuit in which there is connected a current measuring instrument calibrated in linear units of altitude and which averages the current pulses in the output circuit.

In a preferred embodiment of the invention, two monostable multi-vibrators are connected in series. The first multi-vibrator is flipped both by trigger pulses from the pulse center of the radar and by pulses from the video output of the radar receiver. For this purpose, the multi-vibrators are in effective connection with a pair of input terminal, one adapted for connection to the video pulse output of the radar receiver and the other adapted for connection to the trigger pulse output of the radar receiver. A reversing stage is connected ahead of the multi-vibrators in such a way that the direct video pulse and the reversed trigger pulse, as applied at the input of the first multi-vibrator, cancel each other. For this purpose, it is sometimes necessary to use a pulse shaper stage to substantially equalize the widths of the trigger pulses and the direct video pulses.

For an understanding of the principles of the invention, reference is made to the following description of a typical embodiment thereof as illustrated in the accompanying drawings.

Figure 2:
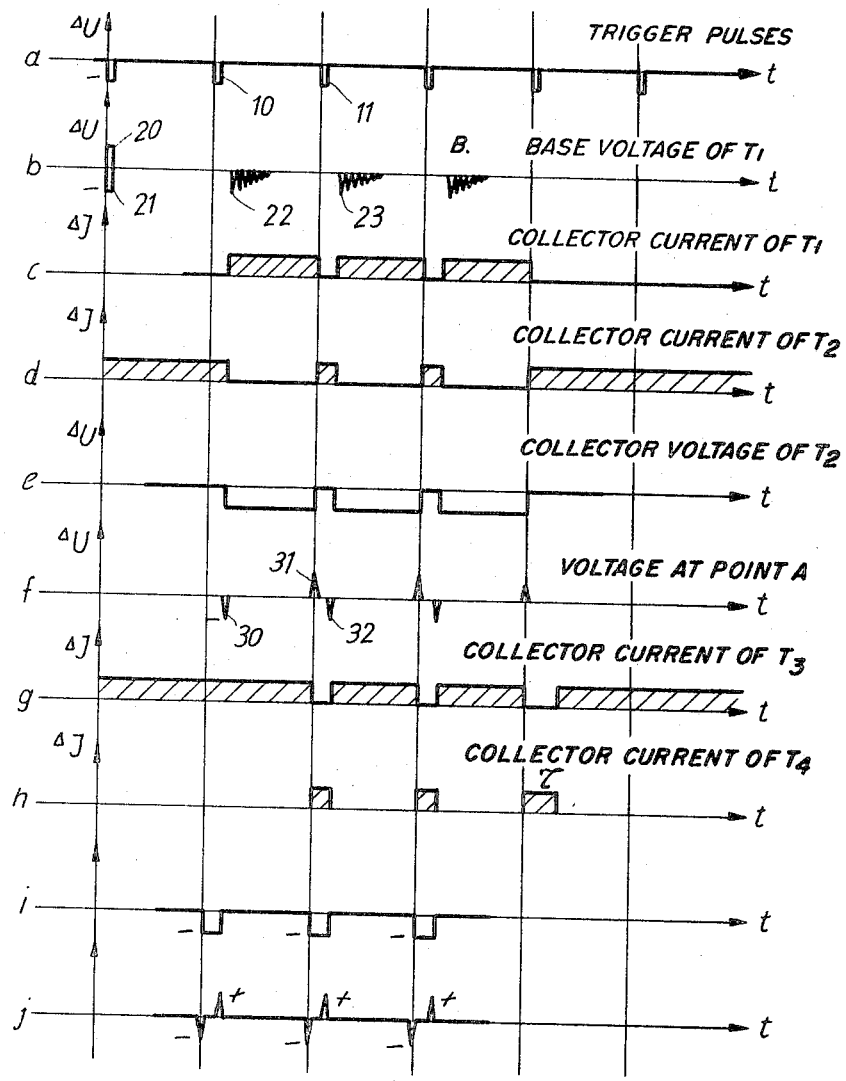
Figure 3:
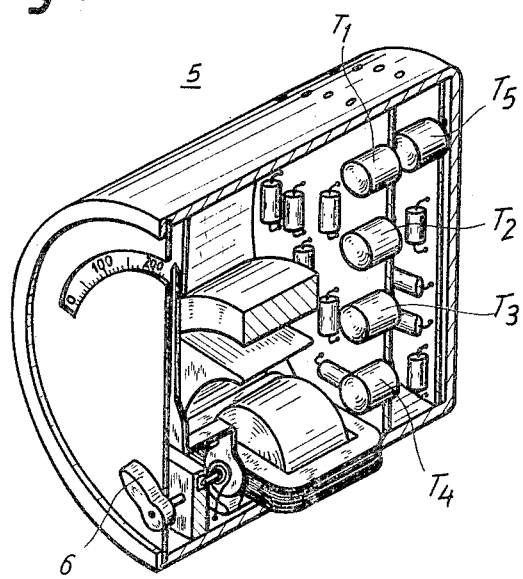

In the drawings:
FIG. 1 is a schematic wiring diagram of continuous altitude indication apparatus embodying the invention;
FIG. 2 is a pulse diagram indicating the relative positions, in time, of pulses in the circuitry of FIG. 1; and
FIG. 3 is an axially sectioned perspective view of a true altitude above ground indicator embodying the present invention.

Referring to FIG. 1, the apparatus of the invention includes a first monostable multi-vibrator I and a second monostable multi-vibrator II, which are connected in series with each other. Multi-vibrator I comprises transistors $T_1$ and $T_2$, and multi-vibrator II comprises transistors $T_3$ and $T_4$. The emitters of all four transistors, $T_1$–$T_4$, are connected, through a common emitter resistance $R_1$ and a condenser $C_1$, to the positive pole of a source of potential which has not been illustrated. By virtue of the voltage drop across emitter resistance $R_1$, the emitters of transistors $T_1$–$T_4$ are at a lower potential, above the negative terminal of the source, than normal, so that those transistors, which, at any instant, are not positively triggered are positively blocked.

The base of transistor $T_1$ is positively biased, in the normal or rest condition, through a base resistance $R_2$ connected to the aforementioned positive pole of the source of potential. Also, the base of transistor $T_1$ is connected, through a resistance $R_3$ and a condenser $C_2$, to an input terminal 3 adapted for connection to the video output terminal of the radar receiver on the aircraft, and which radar has not been illustrated. The base of transistor $T_1$ is also connected, through a resistance $R_4$ and a condenser $C_3$, with the collector of a transistor $T_5$.

Transistor $T_5$ constitutes a reversing stage III, and the transistor base is connected, through a condenser $C_4$, with an input terminal 4 adapted for connection to the trigger pulse output terminal of the radar receiver. The base of transistor $T_5$ is further connected, through a resistance $R_{12}$, with the positive pole of the source of potential. Resistances $R_3$ and $R_4$ form summing resistances for the trigger and direct pulses at the outputs of the radar receiver.

Input terminal 4 is coupled through a condenser $C_5$ to the base of transistor $T_2$, and the base of transistor $T_2$ is connected, through a base resistance $R_5$, with the negative pole of the source of potential. A feedback condenser $C_6$ connects the base of transistor $T_2$ with the collector of transistor $T_1$, and the collector of transistor $T_1$ is connected to the negative pole of the potential source through a collector resistance $R_6$.

The collector of transistor $T_2$ is connected with the base of transistor $T_1$ through a resistance $R_{19}$, and is also connected to the negative pole of the potential source through a collector resistance $R_7$. The collector of transistor $T_5$ is also connected to the negative pole of the potential source, through a collector resistance $R_8$.

The collector output of transistor $T_2$ is coupled, through series connected condensers $C_9$ and $C_{10}$, with the base of transistor $T_3$ of multi-vibrator II. Condenser $C_9$ is connected, at junction point A, to a resistance $R_9$ which is connected to the positive pole of the potential source, and condenser $C_9$ and resistance $R_9$ constitute means for differentiating output pulses from multi-vibrator I.

The base of transistor $T_3$ is negatively biased through a base resistance $R_{10}$. Negative potential is also applied through a resistance $R_{11}$ to the collector of transistor $T_3$, and this collector is coupled through a resistance $R_{12}$ to the base of transistor $T_4$. The base of transistor $T_4$ is normally positively biased through a base resistance $R_{13}$ connected to the positive terminal of the potential source. A feedback condenser $C_{11}$ is connected between the base of transistor $T_3$ and the collector of transistor $T_4$.

A direct indication of the true altitude above ground of the aircraft is provided by a direct current meter 5 which is connected in the collector circuit of transistor $T_4$ in series with a variable resistance $R_{14}$. A normally open switch 6 is provided and, when closed, this switch connects a fixed resistance $R_{15}$ in parallel wtih variable resistance $R_{14}$ and a fixed value condenser $C_{12}$ in parallel with feedback condenser $C_{11}$. Current for the operation of the system is supplied from the above-mentioned source of potential (not shown) through a series resistance $R_{16}$ connected to the negative terminal of the source. Voltage stabilization is effected by two Zener diodes $Z_1$ and $Z_2$ connected in series across the positive and negative terminals.

The operation of the above-described circuit will be apparent from the following description. As will be noted from FIG. 1, monostable multi-vibrator II is the indicator stage, while monostable multi-vibrator I checks the presence of ground echo pulses in the video channel connected to the input terminal 3. If a ground echo pulse is present at video terminal 3, multi-vibrator I provides a trigger pulse to actuate multi-vibrator II. The transistor $T_5$ and associated elements constitute a reversing stage III connected in advance of monostable multi-vibrator I.

Multi-vibrator I has two inputs, namely the video pulse input terminal 3 and the trigger pulse input terminal 4. Input terminal 3 is connected to the base of transistor $T_1$ through condenser $C_2$ and resistance $R_3$. Input terminal 4 is connected to the base of transistor $T_5$ through the condenser $C_4$. Input terminal 3 receives video pulses from the radar receiver and input terminal 4 receives trigger pulses from the pulse center of the radar. Both pulses are negative. However, since transistor $T_2$ is fully conductive, because its base is biased negative by base resistance $R_5$, the negative trigger pulse at input 4 have no effect on switching the state of multi-vibrator I. However, the situation is quite different with respect to the direct pulses of the video channel applied at input terminal 3. These pulses would trigger transistor $T_1$ conductive. However, as it is desired that this happens only upon receipt of a ground echo pulse, and not upon receipt of a direct pulse, the negative direct video pulse is compensated. This compensation is effected by providing transistor $T_5$ to act as a reversing or inverting stage III, so that the trigger pulse, arriving at input terminal 4 simultaneously with the arrival of a direct video pulse at input terminal 3, is converted to a positive pulse. The negative direct video pulse at input terminal 3, and the inverted trigger pulse at input terminal 4, which is now a positive pulse, are applied through summing resistances $R_3$ and $R_4$ to the base of transistor $T_1$, where the two pulses cancel each other. Thus, the state of multi-vibrator I is not changed by arrival of the direct video pulse at input terminal 3. However, the state is changed, or multi-vibrator I is "flipped," by the arrival of the first ground echo pulse at input terminal 3, since this first ground echo pulse is not compensated by a positive pulse.

The first ground echo pulse thus flips multivibrator I from its stable state, and a negative voltage spike appears at the collector of transistor $T_2$. This negative voltage spike is differentiated by condenser 9 and resistance $R_9$ to provide, at junction point A, a short negative pulse. This short negative pulse is applied, through condenser $C_{10}$, to the base of transistor $T_3$ in multi-vibrator II. However, transistor $T_3$ is already fully conductive, since its base has a negative bias applied thereto through base resistance $R_{10}$. The short negative pulse therefore does not change the state of, or "flip," multi-vibrator II.

When the next succeeding trigger pulse now arrives at input terminal 4, transistor $T_2$ is re-triggered to the conductive state so that a positive voltage spike appears at its collector. This positive voltage spike arrives, as a differentiated positive pulse, at the base of transistor $T_3$ and thus triggers transistor $T_3$ to the non-conductive state. With transistor $T_3$ blocked, transistor $T_4$ becomes conductive so that current flow through D.C. indicating instrument 5. When the first ground echo pulse thereafter arrives at terminal 3, a negative spike appears at the collector of transistor $T_2$, is differentiated, and appears a negative pulse at the base of transistor $T_3$. This flips multi-vibrator II back to its initial state, so that transistor $T_4$ is conductive only during the time interval between the arrival of the trigger pulse at terminal 4 and the arrival of the first ground echo pulse following thereafter at terminal 3. Indicating meter 5, which is calibrated in altitude units such as feet of meters, has an indication corresponding to the average values of the output current pulses of multi-vibrator II.

Since the pulse frequency of the radar apparatus is exactly determined, while the operating voltage of the multi-vibrators I and II is stabilized by Zener diodes $Z_1$ and $Z_2$, the deflection or indication of instrument 5 depends solely on the time during which transistor $T_4$ is conductive. This time is proportional to the altitude of the aircraft above ground. Thereby, D.C. meter 5 can be calibrated directly in altitude units, such as feet or meters, by suitable adjustment of resistance $R_{14}$.

If, during certain flight maneuvers, no ground echo pulses are received, the reading of instrument 5 is zero. If there is a reading and the ground echo pulses suddenly fail, multi-vibrator II flips back to its initial state after a certain time. This time, which corresponds preferably to the maximum value of the measuring range, is determined by condenser $C_{11}$ and resistance $R_{10}$. Upon such flipping back, the instrument reading becomes zero as transistor $T_4$ is blocked and non-conductive. As designated in FIG. 2, this time ($\tau$) is 0.7 x $C_{11}$ x $R_{10}$. The reading error due to a longer duration of $\tau$ is small and cannot be detected by instrument 5. To vary the measuring range, switch 6 is closed to connect fixed resistance $R_{15}$ in parallel with the total resistance of the instrument and, at the same time, capacitance $C_{12}$ is connected in parallel with feedback condenser $C_{11}$.

The relation between the currents and voltages of the various transistors, with respect to time $t$, can be understood best by reference to the pulse diagram of FIG. 2. In FIG. 2, the line $a$ represents the negative trigger pulses 10 and 11 from the pulse center as applied to the input terminal 4, these negative trigger pulses 10 and 11 having values as indicated by $\Delta U$. In line $b$, the negative direct pulse from the video channel is indicated at 21, and the reversed trigger pulse, which is positive, is indicated at 20 as compensating or cancelling the pulse 21. Line $b$ thus indicates the voltage at the base of transistor $T_1$. In the line $b$, the ground echo pulses 22 and 23 trigger transistor $T_1$ to become conductive, as these ground echo pulses are not compensated or cancelled. The conductivity of transistor $T_1$ is indicated by the time-current values in line $c$. Line $d$ represents the current through transistor $T_2$, and it will be noted that transistor $T_2$ is blocked when transistor $T_1$ is conductive.

Line $e$ represents the voltage at the collector of transistor $T_2$, and line $f$ represents the voltage pulses 30, 31, 32 etc. resulting from differentiation of the voltage pulses, in line $e$ at junction point A of FIG. 1. The collector current of transistor $T_3$ resulting from the pulses 30, 31, and 32 applied to its base, is indicated in line $g$. Line $h$ represents the resulting output or collector current of transistor $T_4$, which is indicated and averaged by instrument 5 and thus is a measure of the true altitude of the aircraft above ground.

The method of the invention involves a pure time measurement. Thus, it is possible to calibrate the apparatus of the invention by using rectangular pulse generators having pulse lengths and pulse recurrence frequencies which are exactly adjustable or pre-settable. Such calibration is effected in a simple manner by applying, to input terminal 4 of FIG. 1, the differential quotient $j$, FIG. 2, of a negative rectangular voltage pulse $i$ (FIG. 2). The pulse frequency of the rectangular voltage is selected to be equal to that of the radar apparatus, and the pulse duration is selected to be equal to the pulse duration for the selected altitude range. The first negative pulse in line $j$ does not influence the switching state of multi-vibrator I. Therefore, the currents shown in lines $c$ and $d$ do not change, as everything remains in its initial state. The positive voltage pulse appearing at the collector of transistor $T_5$ also has no influence, since transistor $T_1$ is already blocked.

The following positive pulse appearing in line $j$ triggers transistor $T_2$ non-conductive and triggers transistor $T_1$ conductive, as can be seen by reference to lines $c$ and $d$ of FIG. 2. Thus, the above-mentioned current and voltage changes represented in line $e-h$ are attained. The next negative pulse in line $j$ reverses multi-vibrator II, as illustrated in line $g$ and $h$, so that the above-described measuring operation takes place. By adjustment of series resistance $R_{14}$, the instrument is brought to full deflection. Such deflection may be, for example, 2000 m. for 13.3 mus. pulse time of the calibration voltage shown in line $i$, and the calibration is thus completed. It may happen that the trigger pulses applied to input terminal 4 and the direct video pulses applied to input terminal 3, as derived from the radar receiver, differ in their width or duration. In such case, the pulses would not completely compensate each other at the base of transistor $T_1$. For this purpose, a pulse shaper IV, as shown in FIG. 1, must be connected in series with input terminal 3 or 4, to increase the duration of one pulse to a value equal to the duration of the other pulse.

Slight differences in the amplitudes of the video and trigger pulses will apply a polarizing voltage to the base of transistor $T_1$. However, this is irrelevant so long as this difference in amplitude remains less than the threshold value necessary to reverse multi-vibrator I. Preferably the inverted or reversed polarity trigger pulse is made to be greater in amplitude than the direct video pulse or, in other words, the direct video pulse is over compensated. Since the lower limit of the reading of meter 5 is determined by the pulse width of the transmitted or trigger pulse which, in the present case, may be 1.4 micro-seconds for example, the initial value of the altitude reading, in the present example, may be a value of 210 m.

Referring to FIG. 3, the circuit components of the invention apparatus are mounted on one or more printed circuit boards. These boards are mounted within the housing of meter 5, so that the entire arrangement requires only the space povided by a somewhat axially extended housing of a commercial direct current instrument.

As stated, the output current pulses from transistor $T_4$, or of multi-vibrator II, need not be used to operate a meter 5, but may be used for other purposes such as, for example, being fed to a calculator ror guiding the aircraft or for directing firing at a target.

While a specific embodiment of the invention has been shown as described in detail to illustrate the application of the principles of the invention, it will be understood that the invention may be embodied otherwise without departing from such principles.

What is claimed is:

1. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; a monostable multi-vibrator having a normally non-conductive output circuit; current operated means connected in said output circuit and providing a measure of the duration of current flow in said output circuit; and switching means connecting the input of said multi-vibrator to said terminals; said switching means, responsive to arrival of a trigger pulse at said second terminal, flipping said monostable multi-vibrator to the conductive state and, responsive to arrival of the first ground echo pulse after said trigger pulse at said first terminal, flipping said monostable multi-vibrator back to the normally non-conductive state.

2. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; a first monostable multi-vibrator having its input connected to said terminals; a second monostable multi-vibrator having a normally non-conductive output circuit and having its input connected to the output of said first monostable multi-vibrator; said first multi-vibrator, responsive to simultaneous arrival of a first direct video pulse at said first terminal and a first trigger pulse at said second terminal, retaining its normal state; said first multi-vibrator, responsive to arrival of the first ground echo pulse after said first trigger pulse at said first terminal, flipping to provide, to the input of said second multi-vibrator, a pulse ineffective to flip said second multi-vibrator; said first multi-vibrator, responsive to the arrival of an immediately succeeding trigger pulse at said second terminal, flipping back to its initial state to provide an output pulse to the input of said second multi-vibrator to flip said second multi-vibrator to the conductive state; said first multi-vibrator, responsive to the arrival at said first terminal of the first ground echo pulse following said second trigger pulse, flipping to provide, to the input of said second monostable multi-vibrator, a pulse flipping said second multi-vibrator back to the non-conductive state; and current responsive means connected in the output circuit of said second monostable multi-vibrator and providing a measure of the duration of current flow in the output circuit thereof.

3. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; a first monostable multi-vibrator connected to said first terminal; a reversing stage connected between said second terminal and said first monostable multi-vibrator; a second monostable multi-vibrator having its input connected to the output of said first monostable multi-vibrator and having a normally non-conductive output circuit; said reversing stage reversing the polarity of trigger pulses appearing at said second terminal; said first monostable multi-vibrator, responsive to the appearance of a first direct pulse at said first terminal and a first trigger pulse at said second terminal, maintaining its state; said first monostable multi-vibrator, responsive to the appearance of the first ground echo pulse following said direct pulse at said first terminal, flipping to provide an input pulse to said second monostable multi-vibrator which is ineffective to flip said second monostable multi-vibrator; said first monostable multi-vibrator, responsive to the appearance of a second trigger pulse at said second terminal, flipping back to its initial state to provide an input pulse to said second monostable multi-vibrator effective to flip said second monostable multi-vibrator to render said output circuit conductive; said first monostable multi-vibrator, responsive to the appearance of the first ground echo pulse following said second trigger pulse at said second terminal, flipping back to its initial state to provide an input pulse to said second monostable multi-vibrator effective to flip said second monostable multi-vibrator back to its initial state in which said output circuit is non-conductive; and current responsive means connected in said output circuit and providing a measure of the average value of the pulses in said output circuit as a measure of the true altitude above ground of the aircraft.

4. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators connected in series with each other; each multi-vibrator comprising a first transistor and a second transistor, and all four transistors being connected for emitter operation; means connecting the first transistor of said first multi-vibrator to said first terminal; a reversing stage, comprising a transistor connected for emitter operation, connected between said second terminal and said first transistor of said first multi-vibrator; whereby negative video pulses arriving at said first terminal are applied to said first transistor of said first multi-vibrator, and negative trigger pulses arriving at said second terminal are reversed in polarity and then applied to said first transistor of said first multi-vibrator; coupling means connecting said second terminal to the base of the second transistor of said first multi-vibrator; coupling means connecting the second transistor of said first multi-vibrator to the first transistor of said second multi-vibrator; and a direct current indicating meter connected in the collector circuit of the second transistor of said second multi-vibrator; whereby direct and trigger pulses arriving substantially simultaneously at first and second terminals, respectively, are cancelled at the first transistor of said first multi-vibrator, and the first ground echo, following a trigger pulse, flipping said first multi-vibrator to provide an input pulse, of a selected polarity, to said second multi-vibrator; said first multi-vibrator being flipped back to its initial state responsive to the subsequent arrival of a trigger pulse at said second terminal to provide an input pulse of an opposite polarity to said second multi-vibrator.

5. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators connected in series with each other; each multi-vibrator comprising a first transistor and a second transistor, and all four transistors being connected for emitter operation; means connecting the first transistor of said first multi-vibrator to said first terminal; a reversing stage, comprising a transistor connected for emitter operation, connected between said second terminal and said first transistor of said first multi-vibrator; whereby negative video pulses arriving at said first terminal are applied to said first transistor of said first multi-vibrator, and negative trigger pulses arriving at said second terminal are reversed in polarity and then applied to said first transistor of said first multi-vibrator; coupling means connecting said second terminal to the base of the second transistor of said first multi-vibrator; coupling means connecting the second transistor of said first multi-vibrator; a direct current indicating meter connected in the collector circuit of the second transistor of said second multi-vibrator; whereby negative direct and trigger pulses arriving substantially simultaneously at said first and second terminals, respectively, are cancelled at the first transistor of said first multi-vibrator, and the first ground echo, following a trigger pulse, flipping said first multi-vibrator to provide an input pulse, of a selected polarity, to said second multi-vibrator; said first multi-vibrator being flipped back to its initial state responsive to the subsequent arrival of a trigger pulse at said second terminal to provide an input pulse of an opposite polarity to said second multi-vibrator; and a pulse shaper connected in series with one of said first and second terminals to substantially equalize the widths of the direct pulses arriving at said first terminal and the trigger pulses arriving at said second terminal.

6. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators connected in series with each other; each multi-vibrator comprising a first transistor and a second transistor, and all four transistors being connected for emitter operation; means connecting the first transistor of said first multi-vibrator to said first terminal; a reversing stage, comprising a transistor connected for emitter operation, connected between said second terminal and said first transistor of said first multi-vibrator; whereby negative video pulses arriving at said first terminal are applied to said transistor of said first multi-vibrator, and negative trigger pulses arriving at said second terminal are reversed in polarity and then applied to said first transistor of said first multi-vibrator; coupling means connecting said second terminal to the base of the second transistor of said first multi-vibrator; coupling means connecting the second transistor of said first multi-vibrator to the first transistor of said second multi-vibrator; a direct current indicating meter connected in the collector circuit of the second transistor of said second multi-vibrator; whereby negative direct and trigger pulses arriving substantially simultaneously at said first transistor of said first multi-vibrator, and the first ground echo, following a trigger, flipping said first multi-vibrator to provide an input pulse, of a selected polarity, to said second multi-vibrator; said first multi-vibrator being flipped back to its initial state responsive to the subsequent arrival of a trigger pulse at said second terminal to provide an input pulse of an opposite polarity to said second multi-vibrator; and a pulse shaper connected in series with said second terminal to bring the width of the trigger pulses thereat to the width of the direct pulses at said first terminal.

7. Device for continuous indication of the true altitude above ground of an aircraft equipped with radar, and using video and trigger pulses of the radar receiver, said device comprising, in combination, a first terminal for connection to the video pulse output of the radar receiver, a second terminal for connection to the trigger pulse output of the radar receiver; first and second monostable multi-vibrators, each of said multi-vibrators comprising a first transistor and a second transistor, and all four transistors being connected for emitter operation; means connecting the base of the first transistor of said first multi-vibrator to said first terminal; a reversing stage, including a transistor, connected between said second terminal and the base of the first transistor of said first multi-vibrator; coupling means connecting said second terminal to the base of the second transistor of said first multi-vibrator; differentiating means connecting the collector of the second transistor of said first multi-vibrator to the base of the first transistor of said second multi-vibrator; and a direct current indicating meter connected in the collector circuit of the second transistor of said second multi-vibrator; the first transistor of said first multi-vibrator being non-conductive in the state of rest of the latter, and being triggered conductive only by negative polarity pulses; the first transistor of said second multi-vibrator being conductive in the state of rest of the latter, and being triggered to be non-conductive only by positive polarity pulses; said first multi-vibrator supplying a positive polarity pulse to reverse the state of said second multi-vibrator only upon arrival of ground echo pulses at said first terminal.

8. Device for the continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators, each of said multi-vibrators comprising a first transistor and a second transistor, and all four transistors being connected for emitter operation; means connecting the base of the first transistor of said first multi-vibrator to said first terminal; a reversing stage, including a transistor, connected between said second terminal and the base of the first transistor of said first multi-vibrator; coupling means connecting said second terminal to the base of the second transistor of said first multi-vibrator; differentiating means connecting the collector of the second transistor of said first multi-vibrator to the base of the first transistor of said second multi-vibrator; a direct current indicating meter connected in the collector circuit of the second transistor of said second multi-vibrator; the first transistor of said first multi-vibrator being non-conductive in the state of rest of the latter, and being triggered conductive only by negative polarity pulses; the first transistor of said second multi-vibrator being conductive in the state of rest of the latter, and being triggered to be non-conductive only by positive polarity pulse to reverse the state of said second multi-vibrator only upon arrival of ground echo pulses as said terminal; and a variable resistance connected in series with said direct current indicating meter.

9. Device for the continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators, each of said multi-vibrators comprising a first transistor and a second transistor, and all four transistors being connected for emitter operation; means connecting the base of the first transistor of said first multi-vibrator to said first terminal; a reversing stage, including a transistor, connected between said second terminal and the base of the first transistor of said first multi-vibrator; coupling means connecting said second terminal to the base of the second transistor of said first multi-vibrator; differentiating means connecting the collector of the second transistor of said first multi-vibrator to the base of the first transistor of said second multi-vibrator; a direct current indicating meter connected in the collector circuit of the second transistor of said second multi-vibrator; the first transistor of said first multi-vibrator being non-conductive in the state of rest of the latter, and being triggered conductive only by negative polarity pulses; the first transistor of said second multi-vibrator being conductive in the state of rest of the latter, and being triggered to be non-conductive only by positive polarity pulses; said first multi-vibrator supplying a positive polarity pulse to reverse the state of said second mutli-vibrator only upon arrival of ground echo pulses at said first terminal; a first coupling condenser interconnecting the first and second transistors of said second multi-vibrator; a first variable resistance connected in series with said direct current indicating meter; a second fixed resistance; switch means selectively operable to connect said second resistance in parallel with said first resistance and said direct current indicating meter to vary the measuring range; and a second condenser; said switch means, when so selectively operated, connecting said second condenser in parallel with said first condenser.

10. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators connected in series with each other; each multi-vibrator comprising a first transistor and a second transistor, and all four transistors being connected for emitter operation; means connecting the first transistor of said first multi-vibrator to said first terminal; a reversing stage, comprising a transistor connected for emitter operation, connected between said second terminal and said first transistor of said first multi-vibrator; whereby negative pulses arriving at said first terminal are applied to said first transistor of said first multi-vibrator and negative pulses arriving at said second terminal are reversed in polarity and then applied to said first transistor of said first multi-vibrator; coupling means connecting said second terminal to the base of the second transistor of said first multi-vibrator; coupling means connecting the second transistor of said first multi-vibrator to the first transistor of said second multi-vibrator; a direct current indicating meter connected in the collector circuit of the second transistor of said second multi-vibrator; whereby direct and trigger pulses arriving substantially simultaneously at said first and second terminals, respectively, are cancelled at the first transistor of said first multi-vibrator, and the first ground echo, following a trigger pulse, flipping said first multi-vibrator to provide an input pulse, of a selected polarity, to said second multi-vibrator; said first multi-vibrator being flipped back to its initial state responsive to the subsequent arrival of a trigger pulse at said second terminal to provide an input pulse of an opposite polarity of said second multi-vibrator; a pulse shaper connected in series with one of said first and second terminals to substantially equalize the widths of the direct pulses arriving at said first terminal and the trigger pulses arriving at said second terminal; a source of D.C. potential for said multi-vibrators; and a common emitter resistance commonly connecting the emitters of the four transistors of said first and second multi-vibrators to the positive pole of said source.

11. Device for continuous indication of the true altitude above ground of an aircraft equipped with radar, and using video and trigger pulses of the radar receiver, said device comprising, in combination, a first terminal for connection to the video pulse output of the radar receiver; a second terminal for connection to the trigger pulse output of the radar receiver; first and second monostable multi-vibrators connected in series with each other; each multi-vibrator comprising a first transistor and a second transistor, and all four transistors being connected for emitter operation; means connecting the first transistor of said first multi-vibrator to said first terminal; a reversing stage, comprising a transistor connected for emitter operation, connected between said second terminal and said first transistor of said first multi-vibrator; whereby negative pulses arriving at said first terminal are reversed in polarity and then applied to said first transistor of said first multi-vibrator; coupling means connecting said second terminal to the base of the second transistor of said first multi-vibrator; coupling means connecting the second transistor of said first multi-vibrator to the first transistor of said second multi-vibrator; a direct current indicating meter connected to the collector circuit of the second transistor of said second multi-vibrator; whereby negative direct and trigger pulses arriving substantially simultaneously at said first and second terminals, respectively, are cancelled at the first transistor of said first multi-vibrator, and the first ground echo, following a trigger pulse, flipping the said first multi-vibrator to provide an input pulse, of a selected polarity, to said second multi-vibrator; said first multi-vibrator being flipped back to its initial state responsive to the subsequent arrival of a trigger pulse at said second terminal to provide an input pulse of an opposite polarity to said second multi-vibrators; a pulse shaper connected in series with one of said first and second terminals to substantially equalize the widths of the direct pulses arriving at said first terminal and the trigger pulses arriving at said second terminal; a source of D.-C. operating potential for said multi-vibrators; and a resistance, connected to one terminal of said source, and a pair of series-connected Zener diodes connected between said resistance and the other terminal of said source, to stabilize the operating voltage of said multi-vibrators.

References Cited by the Examiner
UNITED STATES PATENTS

| | | | |
|---|---|---|---|
| 2,740,112 | 3/1956 | Goldberg | 343—13 X |
| 3,125,754 | 3/1964 | Reumerman et al. | 343—13 |
| 3,185,984 | 5/1965 | Child et al. | 343—13 X |

CHESTER L. JUSTUS, *Primary Examiner.*

J. P. MORRIS, *Assistant Examiner.*